(No Model.)
G. W. GORDON.
HAND CORN SHELLER.
No. 274,588. Patented Mar. 27, 1883.
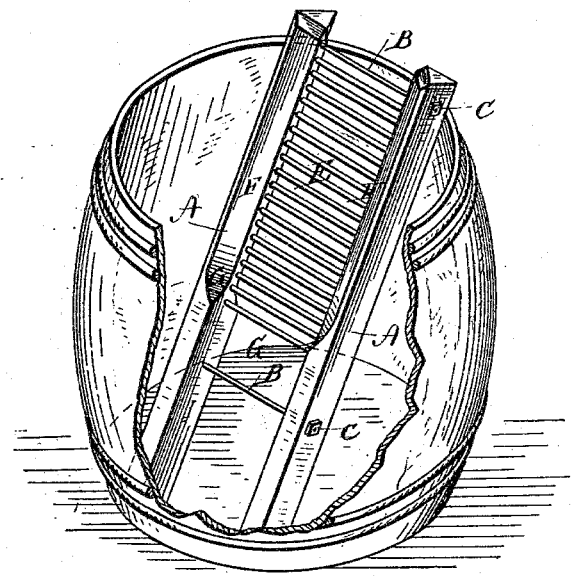
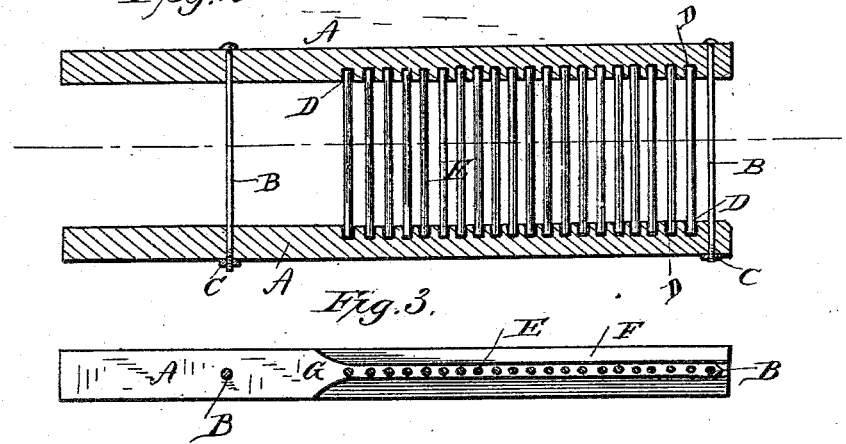
WITNESSES
F. L. Ouraud
J. R. Littell
George W. Gordon,
INVENTOR
by
C. A. Snow & Co.
Attorneys.

UNITED STATES PATENT OFFICE.

GEORGE W. GORDON, OF SUTTON, KENTUCKY.

HAND CORN-SHELLER.

SPECIFICATION forming part of Letters Patent No. 274,588, dated March 27, 1883.

Application filed January 24, 1883. (No model.)

*To all whom it may concern:*

Be it known that I, GEORGE W. GORDON, a citizen of the United States, residing at Sutton, in the county of Ohio and State of Kentucky, have invented a new and useful Hand Corn-Sheller, of which the following is a specification, reference being had to the accompanying drawings.

This invention relates to hand corn-shellers, and has for its object to provide a simple, inexpensive, and efficient sheller that will effect a rapid and complete removal of all the grains without damaging the same.

In the drawings, Figure 1 is a perspective view of my improved corn-sheller in position for use. Fig. 2 is a longitudinal transverse sectional view of the same. Fig. 3 is a longitudinal transverse sectional view taken at right angles to the section illustrated in Fig. 2.

Referring to the drawings, A A designate two longitudinal side pieces, which are connected at the top and bottom by transverse bolts B, secured by a nut, C. Along the inner edge of both side pieces is about centrally disposed a longitudinal series of holes or recesses, D, in which fit the ends of the transverse cylindrical shelling-bars E. The series of holes D extend about two-thirds the distance down the side bars from the top, and the inner edges of both the side bars are beveled toward the outer edges of the said side pieces from the series of holes and on each side of the latter. At the bottom of each of these beveled portions F the bevel is gradually diminished, as shown at G.

It will be observed that the transverse shelling-rods are retained in the holes or sockets in the side pieces, and the latter are connected securely together by means of the transverse bolts and nuts at the top and bottom. By turning these nuts the different parts of the sheller can be readily separated for purpose of substitution or repair, if necessary.

The operation and advantages of my improved sheller will be readily understood. The device is first placed in an ordinary barrel, and resting in an inclined position against the side thereof. The ear of corn, which is to be held in the hand with the large or butt end upward, is then driven downwardly against the shelling-rods, which latter will remove the grains, and they will drop down between the shelling-rods into the barrel as they are removed. The smooth cylindrical surface of the shelling-rods will effectively remove the grains without damaging them in the least, while should the hand come in contact with the shelling-rods no inconvenience will be occasioned by the contact. The beveled side edges of the side pieces guide the ear from lateral displacement, but offer little resistance to the movement of the ear. The transverse shelling-rods can be formed of stiff, unyielding wire; or they may be made elastic, so as to give to the grains of corn to a slight degree.

I claim as my invention—

As an improvement in hand corn-shellers, the combination of the side pieces having their inner edges beveled, and provided with holes or sockets disposed longitudinally down their inner edges, between the said beveled portions, transverse cylindrical shelling-rods having their ends fitting in the said holes, and transverse connecting-bolts secured by nuts, as set forth.

In testimony that I claim the foregoing as my own I have hereto affixed my signature in presence of two witnesses.

GEORGE WASHINGTON GORDON.

Witnesses:
JAMES M. STOGNER,
SARAH E. STOGNER.